United States Patent [19]

Furuya

[11] Patent Number: 5,193,339
[45] Date of Patent: Mar. 16, 1993

[54] METHOD OF AND AN APPARATUS FOR CONTROLLING THE AIR-FUEL RATIO OF AN INTERNAL COMBUSTION ENGINE

[75] Inventor: Junichi Furuya, Isesaki, Japan
[73] Assignee: Japan Electronic Control Systems Co., Ltd., Isesaki, Japan
[21] Appl. No.: 784,395
[22] PCT Filed: May 16, 1991
[86] PCT No.: PCT/JP91/00650
    § 371 Date: Dec. 31, 1991
    § 102(e) Date: Dec. 31, 1991

[30] Foreign Application Priority Data

May 16, 1990 [JP] Japan ................... 2-124184

[51] Int. Cl.$^5$ ............................................. F01N 3/20
[52] U.S. Cl. ............................. 60/274; 60/276; 60/285; 123/674; 123/691
[58] Field of Search ................. 60/274, 276, 285; 123/674, 691

[56] References Cited

U.S. PATENT DOCUMENTS 4,901,240  2/1990  Schmidt ..................... 123/674
5,077,970  1/1992  Hamburg ..................... 60/277

FOREIGN PATENT DOCUMENTS 58-48756   3/1983  Japan .
63-97851   4/1988  Japan .
63-179155  7/1988  Japan .
1-285635  11/1989  Japan .

*Primary Examiner*—Douglas Hart
*Attorney, Agent, or Firm*—Foley & Lardner

[57] ABSTRACT

An air-fuel ratio controlling apparatus carries out air-fuel ratio feedback control with the use of air-fuel ratio sensors disposed on the upsteam and downstream sides of a three-way catalytic converter. An air-fuel ratio feedback correction coefficient calculated based on an output value of the upstream air-fuel ratio sensor is corrected according to a correction quantity obtained based on an output value of the downstream air-fuel ratio sensor. This correction quantity is calculated according to a learned collective correction quantity uniformly applicable for a whole operation region, and learned regional correction quantites applicable for divided operation regions, respectively. When the learned collective correction quantity is corrected through addition, a portion added to the learned collective correction quantity is subtracted from each of the learned regional correction quantities. This subtraction is carried out only on the learned regional correction quantities of the operation regions whose degree of progress of learning is greater than a predetermined value. This arrangement improves the speed and accuracy of the air-fuel ratio learning control carried out according to the downstream air-fuel ratio sensor, and promotes the learning of an operation region in which learning opportunity is small.

14 Claims, 8 Drawing Sheets

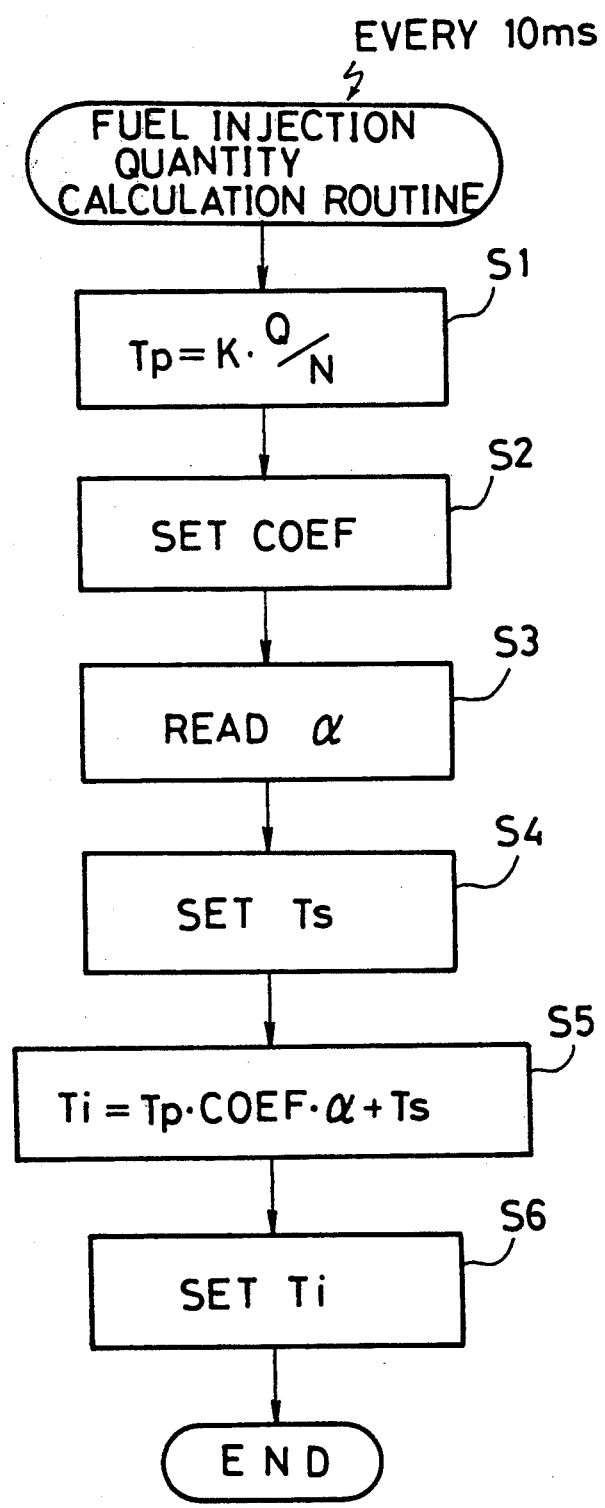

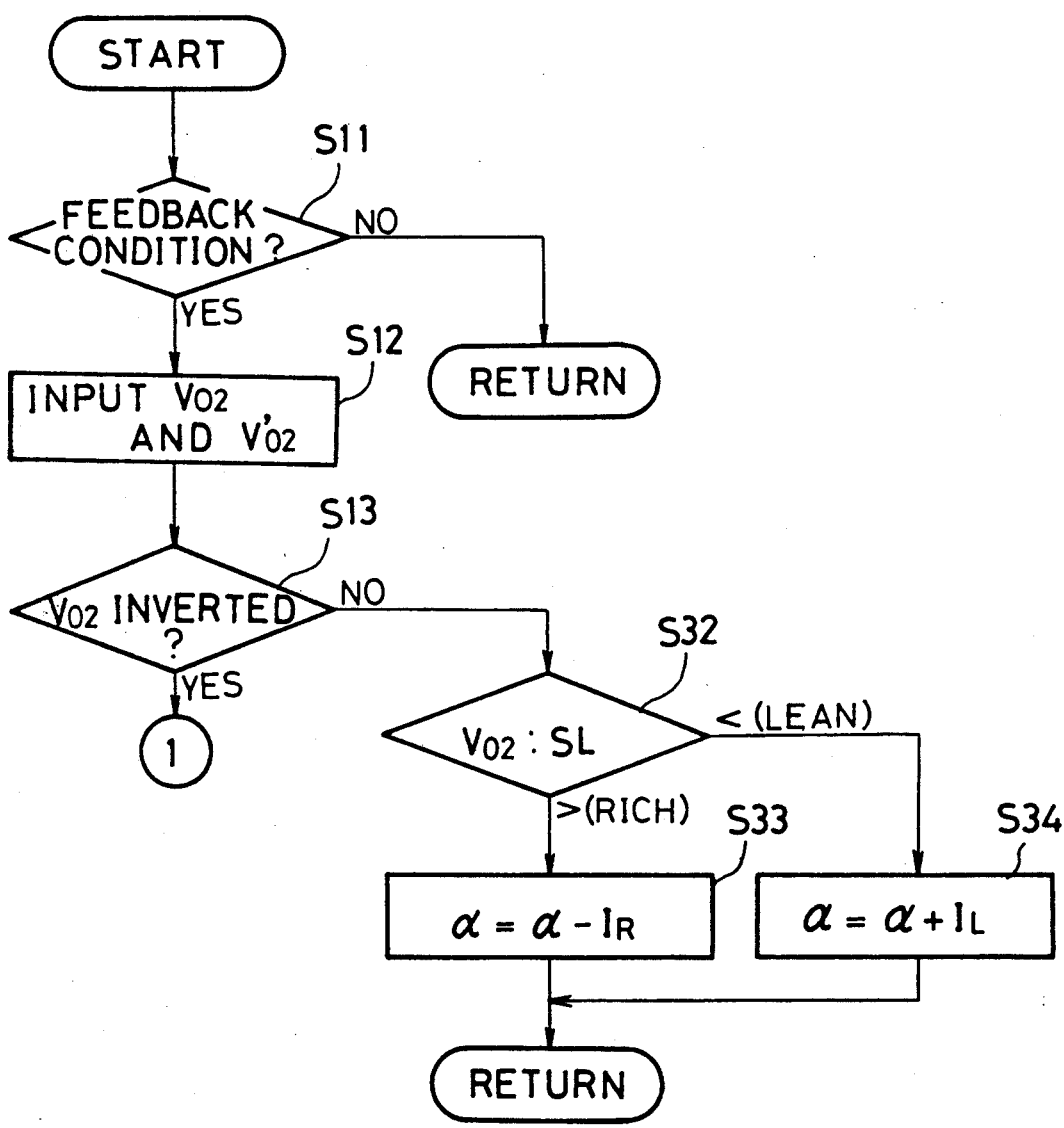
Fig. 4 (1)

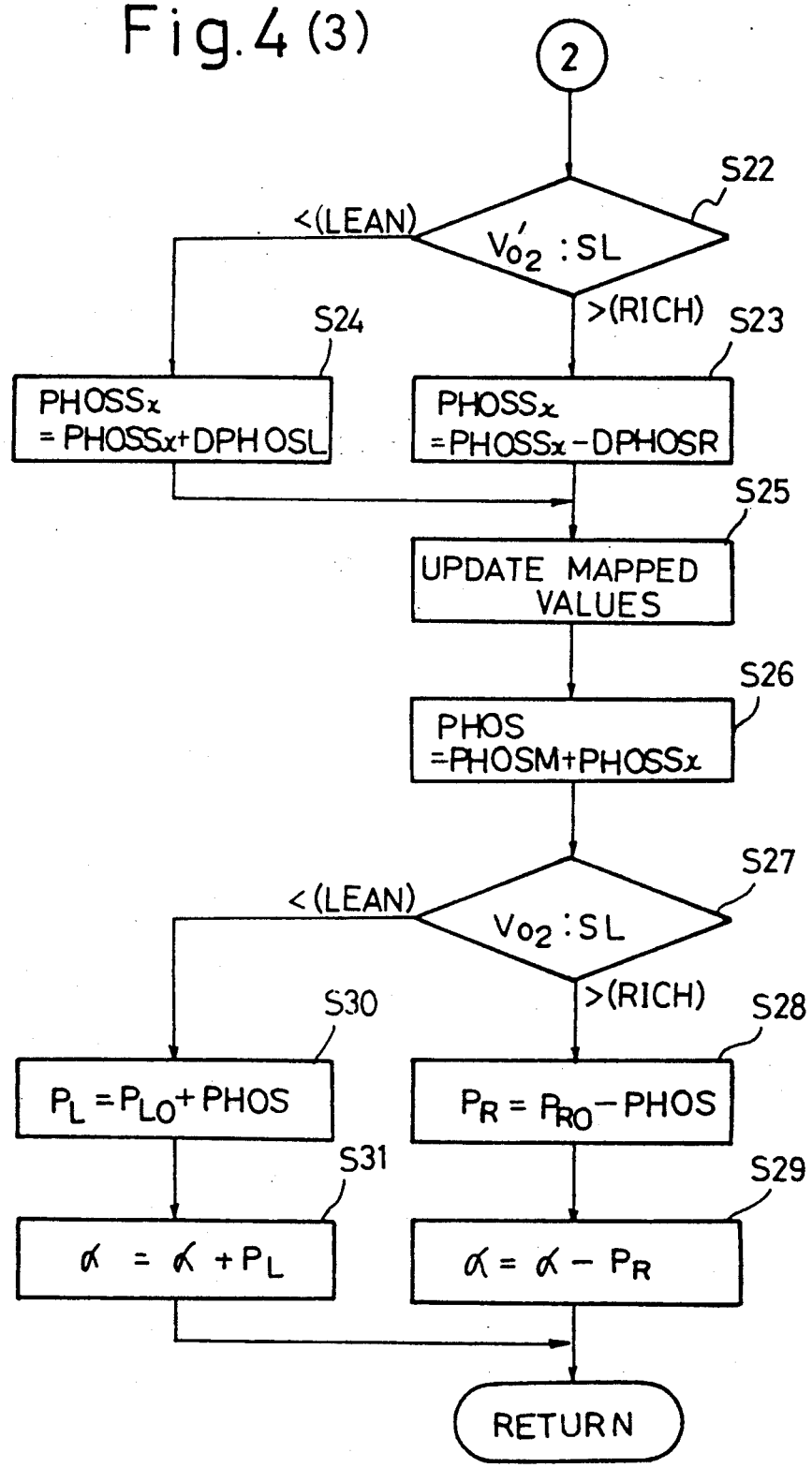
Fig.4 (3)

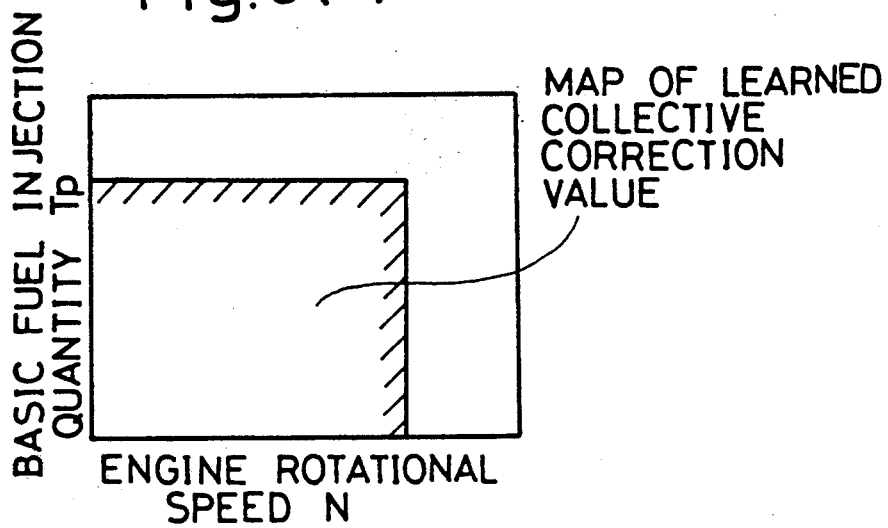
Fig.5(A) MAP OF LEARNED COLLECTIVE CORRECTION VALUE
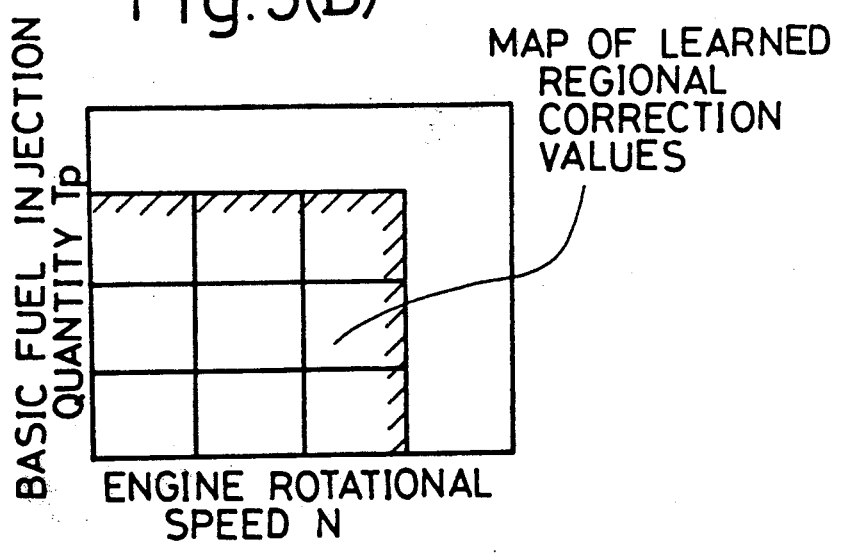
Fig.5(B) MAP OF LEARNED REGIONAL CORRECTION VALUES

METHOD OF AND AN APPARATUS FOR CONTROLLING THE AIR-FUEL RATIO OF AN INTERNAL COMBUSTION ENGINE

TECHNICAL FIELD

The present invention relates to a method of and an apparatus for controlling the air-fuel ratio of an intake air-fuel mixture to an internal combustion engine of a vehicle to a target air-fuel ratio, and particular to a method of and apparatus for precisely controlling the air-fuel ratio according to feedback control carried out according to values detected by two air-fuel ratio sensors disposed on the upstream and downstream sides, respectively, of an exhaust purifying catalytic converter arranged in an exhaust system.

BACKGROUND ART

A three-way catalytic converter is disposed in an exhaust system of an engine to purify an exhaust gas. To provide the catalytic converter with converting efficiency, it is usual to carry out feedback control having the intake air-fuel mixture to the engine maintain a theoretical air-fuel ratio.

The air-fuel ratio feedback control employs an air-fuel ratio sensor (an oxygen sensor) for detecting an air-fuel ratio according to the concentration of oxygen contained in an exhaust gas. To ensure good response from the air-fuel ratio sensor, the sensor is disposed at, for example, a collecting portion of an exhaust manifold in the vicinity of a combustion chamber. The sensor detects the concentration of oxygen contained in the exhaust, and according to the detected concentration, it is determined whether an actual air-fuel ratio is rich or lean with respect to a theoretical air-fuel ratio. According to the rich or lean determination, the feedback control adjusts the supply of a fuel to the engine so that the actual air-fuel ratio will agree with the theoretical air-fuel ratio.

Since the air-fuel ratio sensor is disposed close to the combustion chamber in the exhaust system, the sensor is exposed to high-temperature exhaust, which may thermally deteriorate the characteristics of the sensor. When the oxygen sensor is disposed at the collecting portion of the exhaust manifold, where exhausts from respective cylinders are not sufficiently mixed together yet, the oxygen sensor does not accurately detect a mean air-fuel ratio of all cylinders. Accordingly, the conventional air-fuel ratio feedback control may ensure responsiveness but hardly achieves accurate stabilized air-fuel ratio control.

To solve this problem, it has been proposed to arrange another oxygen sensor on the down stream side of the catalytic converter in addition to the one disposed on the upstream side thereof, and carry out air-fuel ratio feedback control according to values detected by the two oxygen sensors (Japanese Unexamined Patent Publication No. 58-48756).

Although the downstream air-fuel ratio sensor is not advantageous in terms of responsiveness due to its distance from the combustion chamber, it is less affected by heat and toxic components of an exhaust gas on the downstream side of the catalytic converter, and therefore, it can detect a mean air-fuel ratio of all cylinders because it receives a well mixed exhaust. As a result, the downstream air-fuel ratio sensor provides more accurate and stabilized detections compared with those provided by the upstream air-fuel ratio sensor.

Values detected by the two air-fuel ratio sensors are used to set two different air-fuel ratio feedback correction coefficients, which may be combined together and used. Alternatively, a value detected by the downstream air-fuel ratio sensor is used to correct a control quantity (a proportional portion or an integral portion) applied to an air-fuel ratio feedback correction coefficient set by the upstream air-fuel ratio sensor, or correct a comparison voltage used for an output voltage of the upstream air-fuel ratio sensor, or correct a delay time occurring when using a detected result of the upstream air-fuel ratio sensor for actual control. In this way, fluctuations of the output characteristics of the upstream air-fuel ratio sensor are compensated for with the downstream air-fuel ratio sensor, to accurately achieve air-fuel ratio feedback control.

When using the two air-fuel ratio sensors (usually, oxygen sensors) for controlling an air-fuel ratio, a required level of air-fuel correction during the feedback control sometimes greatly differs from that required during non-feedback control (during an open loop). In particular, when the feedback control is started after the non-feedback control, the following problem may occur:

Air-fuel ratio detection by the downstream air-fuel ratio sensor is delayed from that by the upstream air-fuel ratio sensor. If an air-fuel ratio correction control speed by the downstream air-fuel ratio sensor is set to be substantially equal to that of the upstream air-fuel ratio sensor, a large overshoot may occur in the control. To prevent this, the air-fuel ratio control speed of the downstream air-fuel ratio sensor is slowed compared with that of the upstream air-fuel ratio sensor.

As a result it takes time for an air-fuel ratio correction quantity (for example, a correction quantity for a proportional portion of proportional-plus-integral control carried out based on an air-fuel ratio feedback correction quantity derived from the upstream air-fuel ratio sensor) controlled based on the downstream air-fuel ratio sensor to reach a required value. This extends the time required for attaining a target air-fuel ratio, and deteriorates fuel consumption, operability, and the quality of an exhaust gas.

When an operating condition of the engine is shifted from one operation region to a different one during the air-fuel ratio feedback control, an actual air-fuel ratio may greatly deviate from a target air-fuel ratio due to the difference of required air-fuel correction levels between the operation regions. This also deteriorates fuel consumption, operability, and the quality of an exhaust gas.

To solve the problem, it has been proposed to continuously calculate and store mean air-fuel ratio correction quantities as learned correction quantities according to the downstream air-fuel ratio sensor. The learned correction quantities are used with the air-fuel ratio correction quantity to always stably control the air-fuel ratio (Japanese Unexamined Patent Publication No. 63-97851).

Since the air-fuel ratio correction control speed of the downstream air-fuel ratio sensor is set to be relatively low to prevent overshooting, an air-fuel ratio correction quantity for each operation region according to the downstream sensor will not be quickly learned. In addition, the required air-fuel ratio correction quantity greatly changes depending on operating conditions, so that it is preferable to divide a learning region into small regions, to secure learning accuracy. When the region is divided into small regions, however, a learning time for each small region becomes shorter, and each small region seldom corresponds to an acutal operating condition. This prevents a progress of learning.

The conventional technique, therefore, does not realize the two objectives of promoting learning and improving learning accuracy. As a compromise, one conventional technique employs relatively large divided operation regions for storing learned correction quantities, respectively. This, however, deteriorates operability because it deteriorates the quality of an exhaust and fluctuates air-fuel ratio.

To solve the problem, there has been proposed a method of and an apparatus for controlling the air-fuel ratio of an internal combustion engine by simultaneously caring out and balancing collective learning in a wide operation region for improving learning speed, and regional learning in each divided operation region for maintaining learning accuracy. This technique improves the progress and accuracy of air-fuel ratio control learning carried out according to the downstream air-fuel ratio sensor.

This air-fuel ratio control technique with double learning, however, has the following problem to be solved:

When the collective learning for a wide operation region and regional learning for each divided operation region are simultaneously carried out, and when a learned correction quantity for the wide operation range is updated through addition, all divided operation regions in the wide operation region are controlled according to the updated learned correction quantity. It is necessary, therefore, to update a learned correction quantity of each of the divided operation regions by subtracting the updated portion therefrom, to prevent an excessive correction to be made according to the learned correction quantity.

Since the learned quantities of all divided regions are updated through subtraction when the learned collective quantity is updated through addition, a learned quantity stored in any divided operation region whose learning opportunity is very small will not converge, because the learned quantity is updated through subtraction by the learned collective correction quantity before convergence. As a result, the region of small learning opportunity is further delayed to converge. The simultaneous collective and regional learning for improving learning speed and accuracy is not so effective if carried out with the downstream air-fuel ratio sensor having a detection response delay.

To solve these problems, an object of the invention is to provide a method of and an apparatus for controlling the air-fuel ratio of an internal combustion engine, by simultaneously carrying out, in a balanced manner, collective learning in a wide operation region for increasing learning speed and regional learning in divided operation regions for maintaining learning accuracy, thereby improving the accuracy and speed of air-fuel ratio learning control carried out according to a downstream air-fuel ratio sensor.

For this air-fuel ratio learning control with the simultaneous collective and regional learning carried out with the downstream air-fuel ratio sensor, another object of the invention is to quickly converge a value stored in any divided operation region that is seldom learned in the regional learning.

Still another object of the invention is to surely and simply determine any divided operation region that is seldom learned in the regional learning.

DISCLOSURE OF THE INVENTION

To achieve the objects, a method of and an apparatus for controlling the air-fuel ratio of an internal combustion engine according to the invention basically arranges first and second air-fuel ratio sensors on the upstream and downstream sides, respectively, of an exhaust purifying catalytic converter disposed in an exhaust system of the internal combustion engine. Output values of the sensors change in response to the concentration of a specific component contained in an exhaust. The concentration changes in response to the air-fuel ratio of an intake air-fuel mixture to the engine. A first air-fuel ratio correction quantity is calculated according to an output value of the first air-fuel ratio sensor, and a second air-fuel ratio correction quantity is calculated according to an output value of the second air-fuel ratio sensor. According to the two air-fuel ratio correction quantities, a final air-fuel ratio correction quantity is calculated to control the air-fuel ratio of an intake air-fuel ratio mixture to the engine.

According to one feature of the invention, the second air-fuel ratio correction quantity is set as follows:

A plurality of divided operation regions store each learned regional correction quantity, which is corrected and rewritten according to an output value of the second air-fuel sensor. On the other hand, a learned collective correction quantity is stored and collectively used for all divided operation regions. The learned collective correction quantity is corrected and rewritten by adding a correction quantity thereto, the correction quantity being obtained according to a mean level of the learned regional correction quantities. When the learned collective correction quantity is corrected through addition, the added portion is subtracted from the learned regional correction quantity of each of the divided operation regions, thereby rewriting the learned regional correction quantities.

The second air-fuel ratio correction quantity is set according to the learned regional correction quantity of a corresponding operation region and the learned collective correction quantity for a operation regions.

In this way, second air-fuel ratio correction quantities based on outputs of the second air-fuel ratio sensor are learned and set as learned regional correction quantities for the divided regions and a learned collective correction quantity for all operation regions. When learning an air-fuel ratio according to an output value of the second air-fuel ratio sensor, the collective learning ensures learning speed, while the regional learning maintains learning accuracy. It is preferable to determine the degree of progress of learning in each of the divided operation regions that are holding the learned regional correction quantities, respectively, and to prohibit a portion that has been added to the learned collective correction quantity from being subtracted from the learned regional correction quantity of any operation region whose degree of progress of learning is less than a predetermined degree.

With this prohibition of subtraction, even an operation region having a small learning opportunity and slow learning progress can quickly converge to a required level.

When prohibiting a portion added to the learned collective correction quantity from being subtracted from the learned regional correction quantity of an operation region whose learning opportunity is small, it is preferable to determine the number of times the output of the second air-fuel ratio sensor crosses a value corresponding to a target air-fuel ratio in each of the operation regions that are storing learned regional correction quantities, respectively, and determine the degree of progress of learning of each of the operation regions according to the said number of times.

If there is any operation region in which the output of the second air-fuel ratio sensor has never crossed the value corresponding to the target air-fuel ratio, it is understood that the operation region in question has never observed an optimum air-fuel ratio correction quantity for permitting an air-fuel ratio, detected according to the second air-fuel ratio sensor, agree with the target.

On the other hand, if the number of times of crossing the value corresponding to the target air-fuel ratio is large in any one operation region, it is possible to bring the air-fuel correction ratio to an optimum level in the operation region. The said number of times, therefore, can be used as an indication of the degree of progress of learning in a corresponding operation region.

The air-fuel ratio sensors disposed on the upstream and downstream sides, respectively, of the exhaust purifying catalytic converter may be sensors whose output values change in response to the concentration of oxygen contained in an exhaust gas.

The second air-fuel ratio correction quantity may be calculated as a value for correcting a control quantity for the first air-fuel ratio correction quantity.

The exhaust purifying catalytic converter may be a three-way catalytic converter. The first and second air-fuel ratio correction quantities may be calculated to bring air-fuel ratios detected by the first and second air-fuel ratio sensors close to a theoretical air-fuel ratio. This arrangement maintains an optimum oxidation and reduction efficiency of the three-way catalytic converter.

It is preferable to average learned regional correction quantities at which the output of the second air-fuel ratio sensor crosses the value corresponding to the target air-fuel ratio, and correct the learned collective correction quantity according to the average.

The learned collective correction quantity is used for all operation regions, so that it must be an average of required correction levels of all operation regions. It is deemed, in each of the operation regions, that a learned regional correction quantity at which the output of the second air-fuel ratio sensor crosses a value corresponding to the target air-fuel ratio is substantially an optimum correction level of the operation region in question. Such optimum correction levels of the respective operation regions are averaged and used for correcting the learned collective correction quantity.

BRIEF DESCRIPTION OF THE DRAWINGS

FIG. 3 is a flowchart showing a fuel injection quantity setting routine according to the embodiment;

FIGS. 5(A) and 5(B) are views showing operation regions in maps of a learned collective correction quantity learned regional correction quantities.

EMBODIMENT OF THE INVENTION

Figure 1:
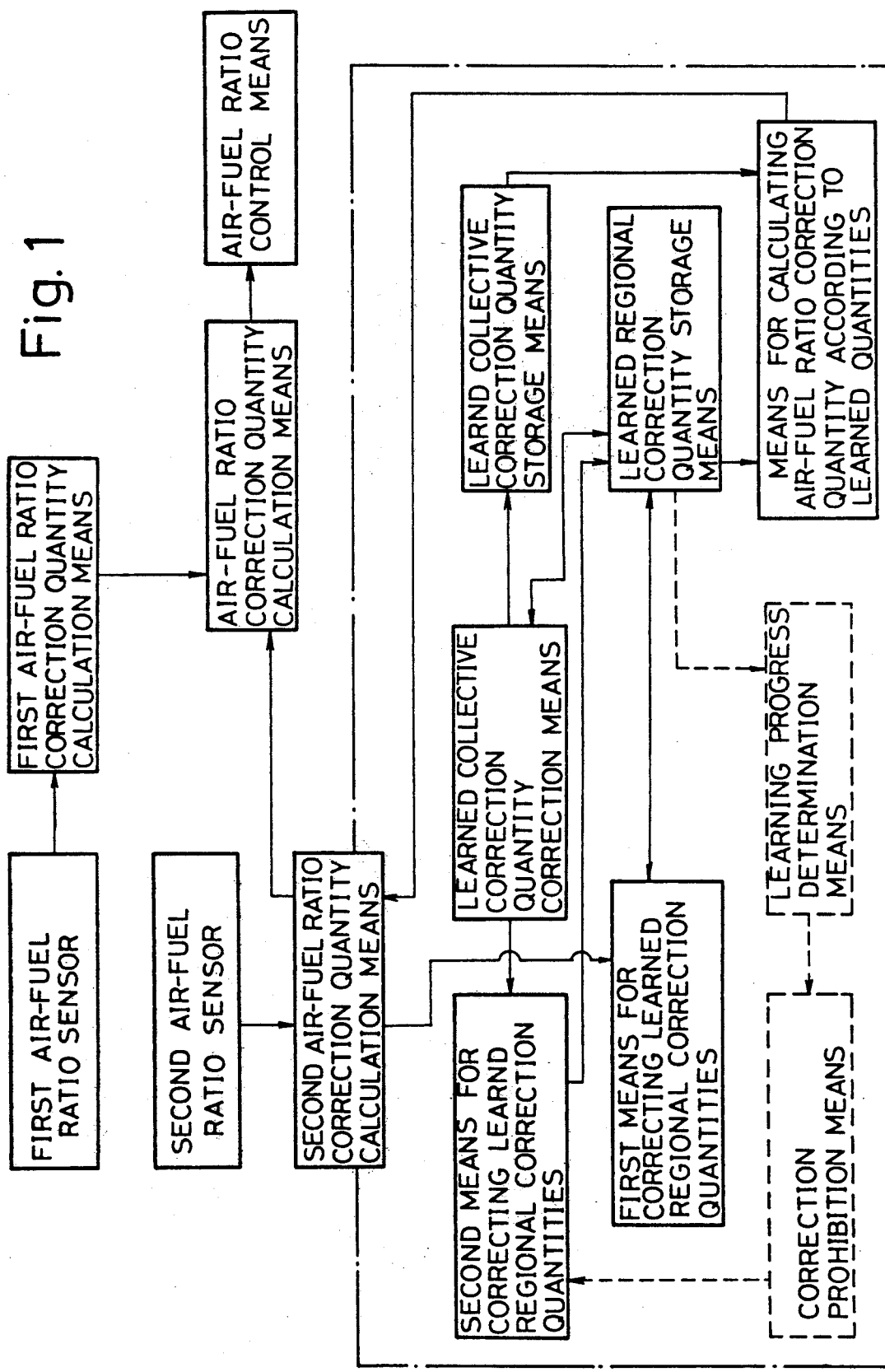
FIG. 1 is a block diagram showing a basic arrangement of an air-fuel ratio control apparatus according to the invention.

An air-fuel ratio control apparatus for an internal combustion engine according to the invention is schematically shown in FIG. 1. An embodiment of a method of and apparatus for controlling the air-fuel ratio of an internal combustion engine is shown in FIGS. 2 to 7.

Figure 2:
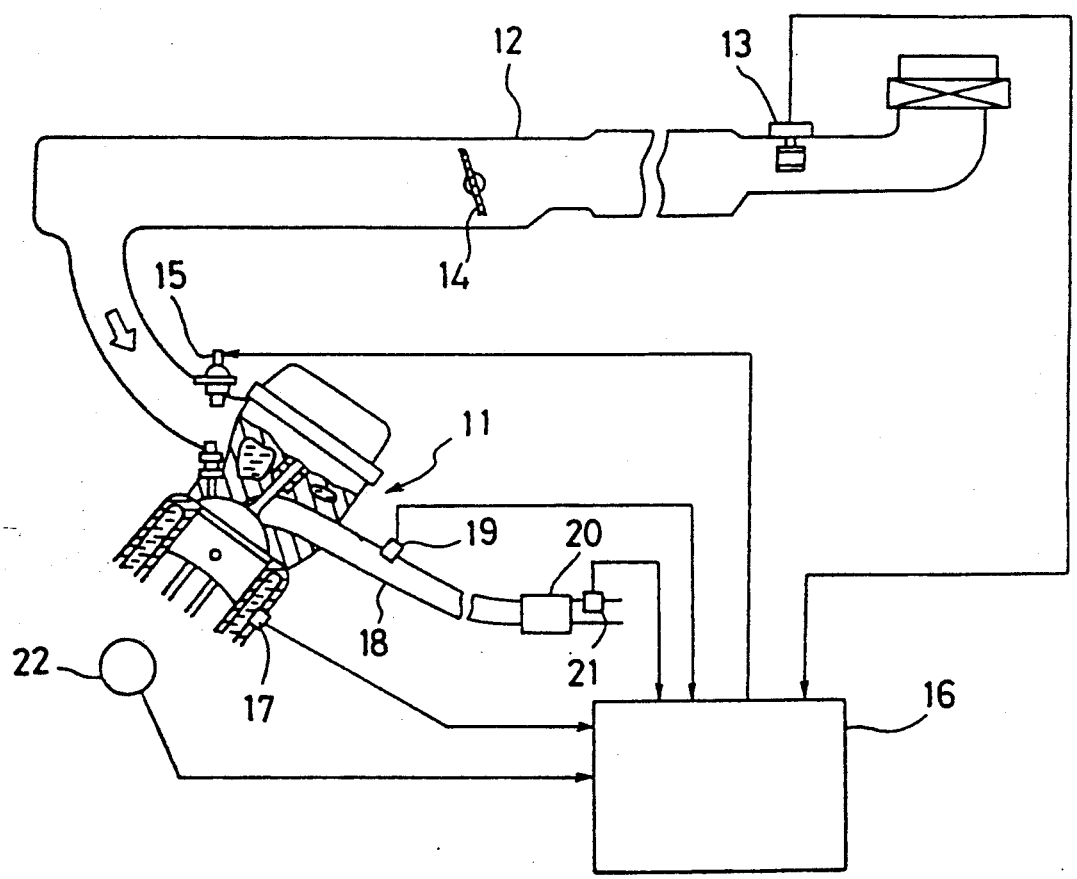
FIG. 2 is a view showing a system according to an embodiment of the invention.

In FIG. 2, the engine 11 is connected to an intake path 12, which has an air-flow meter 13 for detecting an intake air-quantity Q. A throttle valve 14 is interlocked with an acceleration pedal (not shown), for controlling the intake air quantity Q. At each branch of a downstream intake manifold portion, a solenoid fuel injection valve 15 is provided for each cylinder.

The fuel injection valve 15 is driven and opened in response to an injection pulse signal provided by a control unit 16 incorporating a microcomputer. A fuel is pressurized by a fuel pump (not shown), controlled at a predetermined pressure through a pressure regulator, and injected from the fuel injection valve 15.

A water temperature sensor 17 detects the temperature Tw of cooling water in a cooling jacket of the engine 11.

A first air-fuel ratio sensor 19 is disposed at a manifold collecting portion in an exhaust path 18. The sensor 19 detects the concentration of oxygen contained in an exhaust, thereby detecting the air-fuel ratio of an intake air-fuel mixture to the engine. In an exhaust pipe on the downstream side of the sensor 19, there is arranged a three-way catalytic converter 20 serving as an exhaust purifying catalytic converter for oxidizing CO and HC and reducing NOx contained in an exhaust gas. On the downstream side of the three-way catalytic converter 20, a second air-fuel ratio sensor 21 having the same function as that of the first air-fuel ratio sensor 19 is arranged.

The first and second air-fuel ratio sensors 19 and 21 are known oxygen concentration sensors whose output voltages change in response to the concentration of oxygen in an exhaust gas. By utilizing the fact that the concentration of oxygen in an exhaust gas drastically changes around a theoretical air-fuel ratio, the sensors detect whether an actual air-fuel ratio is rich or lean with respect to the theoretical air-fuel ratio.

A crank angle sensor 22 is incorporated in a distributor (not shown in FIG. 2). The crank ankle sensor 22 provides a unit crank angle signal in synchronism of an engine rotational speed. Unit crank angle signals from the sensor 22 are countedfor a predetermined period, or the period of a reference crank angle signal is measured, to detect an engine rotational speed N.

Next, an air-fuel ratio control routine carried out by the control unit 16 will be explained with reference to flowcharts of FIGS. 3 and 4. Air-fuel ratio control according to the embodiment will be roughly explained. An air-fuel ratio feedback correction coefficient $\alpha$ is subjected to proportional-plus-integral control according to an output value of the first air-fuel ratio sensor 19. On the other hand, a control quantity (a proportional portion) of the correction coefficient $\alpha$ is corrected according to an output value of the second air-fuel ratio sensor. The correction control carried out according to the output of the second air-fuel ratio sensor 21 uses collective learning for all operation regions as well as regional learning for each of the operation regions.

Figure 4:
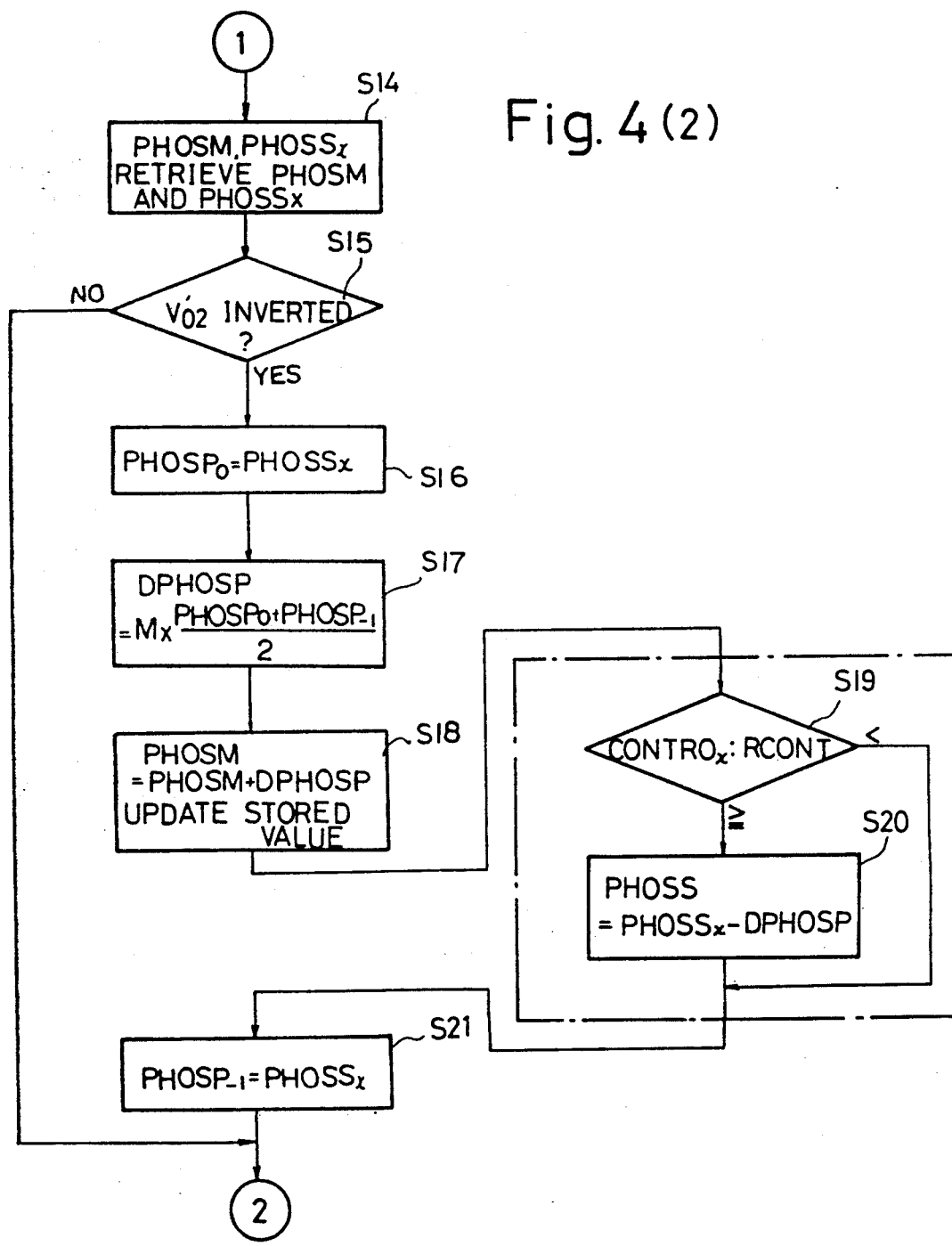
FIGS. 4(1), 4(2) and 4(3) are flowcharts showing an air-fuel ratio feedback correction coefficient setting routine according to the embodiment.

Functions of a means for calculating a first air-fuel ratio correction quantity, means for calculating a second air-fuel ratio correction quantity, means for calculating an air-fuel ratio correction quantity, means for controlling an air-fuel ratio, first means for correcting learned regional correction quantities, means for correcting a learned collective correction quantity, second means for correcting the learned regional correction quantities, means for calculating an air-fuel ratio correction quantity based on the learned quantities, means for determining the progress of learning, and means for prohibiting correction are realized by software shown in the flowcharts of FIGS. 3 and 4 and stored in the control unit 16. A means for storing the learned collective correction quantity and means for storing the learned regional correction quantities are realized by RAMs having a backup function and incorporated in the control unit 16.

FIG. 3 shows a fuel injection quantity setting routine carried out at predetermined intervals (for example, every 10 ms).

Step (indicated as S in the figures) 1 reads an intake air quantity Q detected by the airflow meter 13 as well as an engine rotational speed N calculated according to signals from the crank angle sensor 22, and calculates a basic fuel injection quantity Tp corresponding to an intake air quantity per revolution, according to the following equation:

$$Tp = K \times Q/N \text{ (with K as a constant)}$$

Step 2 determines a correction coefficient COEF according to a cooling water temperature Tw detected by the water temperature sensor 17.

Step 3 reads an air-fuel ratio feedback correction coefficient $\alpha$ (a final air-fuel ratio correction quantity) set according to an air-fuel ratio feedback correction coefficient setting routine to be explained later.

Step 4 sets a voltage correction portion Ts according to a buttery voltage. This is to correct a change in an effective valve open time of the fuel injection valve open time of the fuel injection valve 15 caused by a fluctuation in the battery voltage.

Step 5 calculates a final fuel injection quantity (a fuel supply quantity) Ti according to an equation mentioned below. As is apparent in the equation, the function of Step 5 that sets the fuel injection quantity Ti while correcting the same with the air-fuel ratio feedback correction coefficient $\alpha$ corresponds to the air-fuel ratio control means.

$$Ti = Tp \times COEF \times \alpha + Ts$$

Step 6 sets the calculated fuel injection quantity Ti in an output register. At predetermined fuel injection timing in synchronism with the engine rotational speed, a driving pulse signal having a pulse width corresponding to the calculated fuel injection quantity Ti is given to the fuel injection valve 15, which then injects a fuel.

The air-fuel ratio feedback correction coefficient setting routine will be explained with reference to the flow chart of FIG. 4. This routine is carried out in sychronism with engine rotation.

Step 11 determines whether or not it is an operating condition for carrying out the air-fuel ratio feedback control. (This condition corresponds to an operating condition for obtaining a learned collective correction quantity PHOSM and learned regional correction quantities PHOSSx. It is preferable to improve accuracy by also considering an engine steady operation as one of control conditions.) If it is not the operating condition, this routine is terminated, and the air-fuel ratio feedback correction coefficient $\alpha$ is clamped to a value set at the end of the last air-fuel ratio feedback control, or to a predetermined reference value. Thereafter, the air-fuel ratio feedback control is stopped.

Step 12 receives a signal voltage $V_{O2}$ (an output value) from the first air-fuel ratio sensor 19 and a signal voltage $V'_{O2}$ (an output value) from the second air-fuel ratio sensor 21.

Step 13 compares the signal voltage $V_{O2}$ of the first air-fuel ratio sensor 19 obtained in Step 12 with a reference value SL corresponding to a target air-fuel ratio (a theoretical air-fuel ratio in this embodiment), and determines whether or not an air-fuel ratio has been inverted form lean to rich, or from rich to lean.

If it is determined to be an inversion, Step 14 reads a learned collective correction quantity PHOSM for uniformly correcting a proportional correction quantity PHOS for the air-fuel ratio feedback correction coefficient (air-fuel ratio correction quantity) $\alpha$ out of a learned collective correction quantity map (stored in the RAM of the microcomputer incorporated in the control unit 16). At the same time, Step 14 retrieves, according to the engine rotational speed N and basic fuel injection quantity Tp, a learned regional correction quantity PHOSSx for correcting the proportional correction quantity PHOS from a corresponding operation region in a learned regional correction quantity map (also stored in the RAM) that is storing learned regional correction quantities PHOSSx.

As shown in FIG. 5, the learned collective correction quantity map stores one learned collective correction quantity PHOSM for a whole operation region to be learned, while the learned regional correction quantity map stores learned regional correction quantities PHOSSx in nine operation regions, respectively, which have been divided according to three engine rotational speeds N and three basic fuel injection quantities Tp.

Step 15 compares the signal voltage $V'_{O2}$ from the second air-fuel ratio sensor with the reference value SL corresponding to the target air-fuel ratio (theoretical air-fuel ratio), and determines whether or not the air-fuel ratio has been inverted from lean to rich or from rich to lean (whether or not the air-fuel ratio has crossed the reference value SL corresponding to the target air-fuel ratio).

If it is determined to be an inversion, Step 16 sets the learned regional correction quantity PHOSSx retrieved in Step 14 as a value $PHOSP_0$ to be used this time. Then, Step 17 calculates a correction quantity DPHOSP used for the learned collective correction quantity PHOSM according to the following equation:

$$DPHOSP = M(PHOSP_0 + PHOSP_{-1})/2$$

where $PHOSP_{-1}$ is a learned regional correction quantity PHOSSx obtained when the previous output $V'_{O2}$ of the air-fuel ratio sensor 21 has inverted, and M a positive constant ($<1$). Namely, the correction quantity DPHOSP is set as a predetermined portion of an average of the learned regional correction quantities PHOSSx obtained when the output of the second air-fuel ratio sensor 21 has inverted. Accordingly, the learned collective correction quantity PHOSM learns an averaged level of the learned regional correction quantities PHOSSx of all operation regions.

Step 18 adds the correction quantity DPHOSP calculated in Step 17 to the learned collective correction quantity PHOSM retrieved in Step 14, thereby correcting the learned collective correction quantity PHOSM. The corrected PHOSM is stored in the RAM.

Steps 17 and 18 correspond to the learned collective correction quantity correction means.

Step 19 compares, for each of the operation regions in the learned regional correction quantity map, a count value CONTROx with a predetermined value RCONT. Each count value CONTROx is obtained by accumulating the number of output inversions (the number of rich/lean inversions) of the second air-fuel ratio sensor 21 related to one of the corresponding operation regions in the learned regional correction quantity map. According to each result of the comparison, step 19 determines the degree of progress of learning of the corresponding operation region. When the output of the second air-fuel ratio sensor 21 repeatedly inverts in one operation region, it is understood that the learning of this operation region has been progressed and that an air-fuel ratio correction quantity necessary for this operation region has been learned. When the count CONTROx for one operation region is below the predetermined value, it is understood that the learning of this operation region has not progressed. The predetermined value may be set according to, for example, an average of the count values CONTROx of the operation regions.

In this embodiment, an inversion of the output of the second air-fuel ratio sensor 21 means that the output $V'_{o2}$ of the second air-fuel ratio sensor 21 has crossed the reference value SL corresponding to the theoretical air-fuel ratio, and each count value CONTROLx indicates how many times the air-fuel ratio has changed across the reference value SL.

When Step 19 determines that the count value CONTROx is over the predetermined value RCONT, Step 20 subtracts the correction quantity DPHOSP for the learned collective correction quantity PHOSM from the learned regional correction quantity PHOSSx of the corresponding operation region whose degree of progress of learning is high, and rewrites the map. When the count value CONTROx is below the predetermined value RCONT, Step 20 for correcting and rewriting the learned regional correction quantity PHOSSx is not carried out because the degree of progress of learning of the corresponding operation region is low.

In this way, when the learned collective correction quantity PHOSM is corrected by adding the correction quantity DPHOSP thereto, this will increase by the portion of the correction quantity DPHOSP, a correction quantity of the learned collective correction quantity PHOSM for the whole region plus the learned regional correction quantity PHOSSx. The correction portion DPHOSP, therefore, must be subtracted from each of the learned regional correction quantities PHOSSx. According to this embodiment, however, the subtraction is not carried out on all of the learned regional correction quantities PHOSSx. Instead, only the operation regions that have been determined to have sufficiently learned as subjected to the subtraction.

As a result, the operation regions that have not been subjected to the reduction are set to be rapidly corrected. In this case, the learned regional correction quantities PHOSSx of the operation regions whose degree of progress of learning is insufficient to converge to their required quantities are set to rapidly approach the required quantities. Accordingly, the operation regions of slow progress of learning because of less opportunity to learn may quickly acquire their required values.

Steps 19 and 20 correspond to the learning progress determination means, second means for correcting a learned regional correction quantity, and correction prohibiton means.

Step 21 sets the learned regional correction quantity PHOSSx, which may have been corrected or not corrected in Step 20, corresponding to the present operation condition as $PHOSP_{-1}$ to be used for the next calculation in Step 17. Step 22 is then carried out.

If Step 15 determines that the output of the second air-fuel ratio sensor 21 has not inverted, Steps 16 to 21 are overlooked, and Step 22 is carried out.

Step 22 compares the output $V'_{o2}$ of the second air-fuel ratio sensor 21 with the reference value SL corresponding to the target air-fuel ratio, and determines whether the actual air-fuel ratio is rich or lean with respect to the target.

When the air-fuel ratio is determined to be rich ($V'_{o2} > SL$), a predetermined value DPHOSR is substracted from the learned regional correction quantity PHOSSx retrieved in Step 14, thereby correcting the learned regional correction quantity PHOSSx. When the air-fuel ratio is determined to be lean ($V'_{o2} < SL$), Step 24 adds a predetermined value DPHOSL to the retrieved learned regional correction quantity PHOSSx, thereby correcting the learned regional correction quantity PHOSSx.

Namely, whenever this routine is executed, the learned regional correction quantity PHOSSx of a corresponding operation region is retrieved and read out of the map, and corrected according to the output of the second air-fuel ratio sensor 21 such that an actual air-fuel ratio approaches a target air-fuel ratio.

Steps 22 and 23 correspond to the first means for correcting a learned regional correction quantity.

Step 25 rewrites the learned regional correction quantity PHOSSx stored in a corresponding operation region in the learned regional correction quantity map according to the learned regional correction quantity PHOSSx corrected in Step 23 or 24. In this way, the learned regional correction quantities PHOSSx are sequentially corrected such that the air-fuel ratio detected by the second air-fuel ratio sensor 21 approaches the target. According to results of corrections, the map data are rewritten.

Step 26 adds the updated learned collective correction quantity PHOSM and learned regional correction quantity PHOSSx to each other, to provide a proportional correction quantity PHOS corresponding to the second air-fuel ratio correction quantity related to the output of the second air-fuel ratio sensor 21. The proportional correction quantity PHOS corresponding to the second air-fuel ratio correction quantity is used to correct a control quantity for setting the first air-fuel ratio correction quantity related to the output of the first air-fuel ratio sensor 19.

Step 26 corresponds to the means for calculating an air-fuel ratio correction quantity based on learned quantities.

Step 27 determines whether the value detected by the first air-fuel ratio sensor 19 is rich or lean. If it is determined to be an inversion from lean to rich, Step 28 subtracts the air-fuel ratio correction quantity PHOS from a reference value PRO, thereby updating a proportional decremental portion PR used for setting the air-fuel ratio feedback correction coefficient $\alpha$ in case of the rich inversion. Step 29 subtracts the proportional decremental portion PR from the present air-fuel ratio feedback correction coefficient $\alpha$, thereby updating the correction coefficient $\alpha$.

When it is determined to be an inversion from rich to lean, Step 30 adds the air-fuel ratio correction quantity PHOS to a reference value PLO, thereby updating a proportional incremental portion PL used for setting the air-fuel feedback correction coefficient $\alpha$ in case of the lean inversion. Step 31 adds the proportional incremental portion PL to the present air-fuel ratio feedback correction coefficient $\alpha$, thereby updating the correction coefficient $\alpha$.

If Step 13 determines that the output of the first air-fuel ratio sensor 19 has not been inverted, Step 32 determines whether the present air-fuel ratio is rich or lean with respect to the output of the first air-fuel ratio sensor 19. If it is rich, Step 33 subtracts an integral portion IR from the present air-fuel ratio feedback correction coefficient $\alpha$, thereby updating the correction coefficient $\alpha$. When it is lean, Step 34 adds an integral portion IL to the present air-fuel ratio feedback correction coefficient $\alpha$, thereby updating the correction coefficient $\alpha$.

Among Steps 27 to 34 except the corrections made in Steps 28 and 30, the function of setting the air-fuel ratio feedback correction coefficient $\alpha$ corresponds to the first air-fuel ratio correction quantity calculation means related to the first air-fuel ratio sensor 19, and Steps 27 to 34 including Steps 28 and 30 correspond to the air-fuel ratio correction quantity calculation means.

This arrangement promotes learning in the whole region with learned collective correction quantity PHOSM, to rapidly converge the output of the second air-fuel ratio sensor 21 to a reference value (corresponding to a target air-fuel ratio). At the same time, accurate learning with learned regional correction quantities PHOSSx is made to meet the different correction requests of different operation regions. As a result, the learning speed and accuracy of the air-fuel ratio learning control based on the second air-fuel ratio sensor 21 are both improved.

Figure 6:
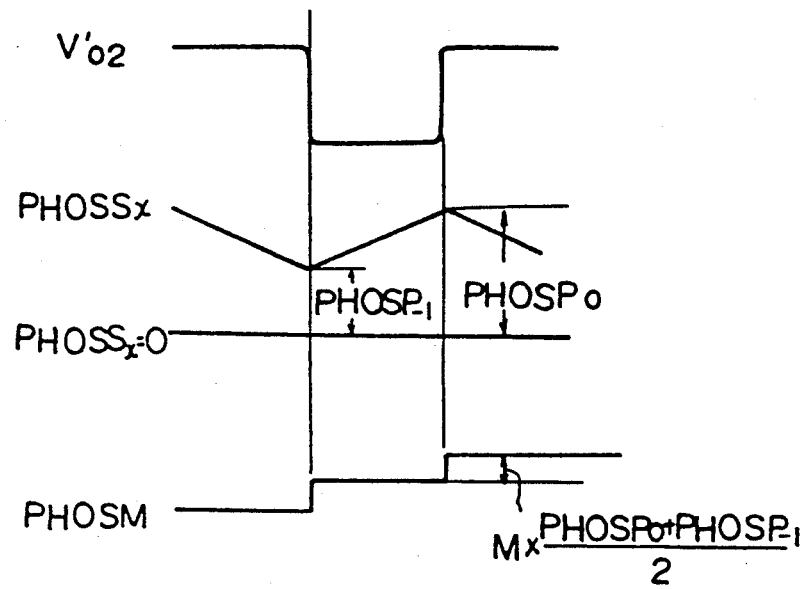
FIGS. 6 and 7 are diagrams explaining the updating of learned collective and regional correction quantities.
Figure 7:
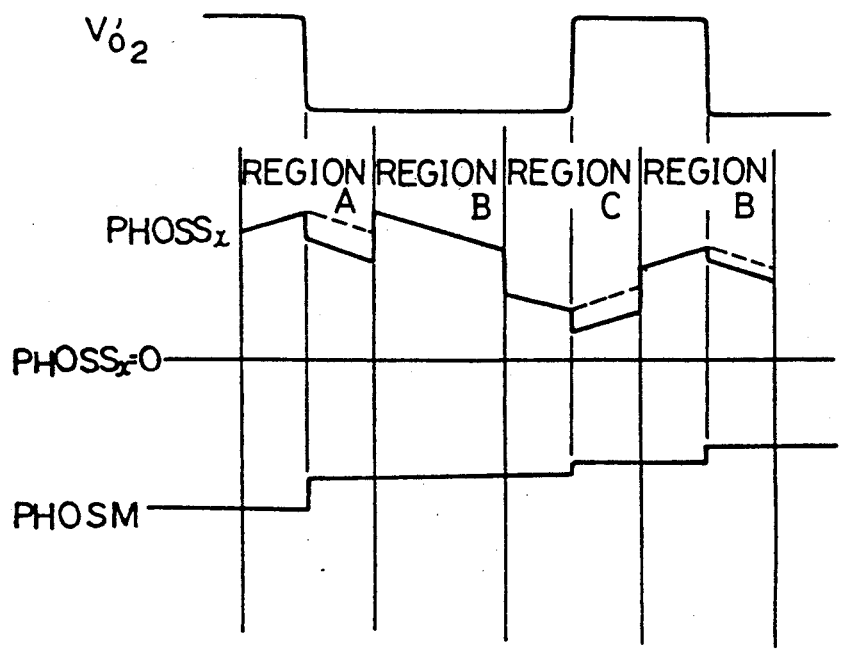

FIGS. 6 and 7 show states of updating the learned collective correction quantity PHOSM and learned regional correction quantities PHOSSx.

According to this embodiment, the air-fuel ratio feedback control is carried out basically according to values detected by the first air-fuel ratio sensor 19, and a proportional portion of the air-fuel ratio feedback correction coefficient used for the air-fuel ratio feedback control is corrected according to values detected by the second air-fuel ratio sensor. The invention is not limited to this embodiment. For example, instead of the proportional portion of the feedback correction coefficient, an integral portion thereof may be corrected. Alternatively, the air-fuel ratio sensors may set air-fuel ratio feedback correction coefficient, respectively, which may be combined to provide an air-fuel ratio feedback correction coefficient to be used for correcting a fuel injection quantity. Also, while carrying out the air-fuel ratio feedback control according to the first air-fuel sensor, the reference value SL used for rich/lean determination according to an output value of the first air-fuel ratio sensor 19, and a delay time for setting an air-fuel ratio feedback correction coefficient LMD based on the output value of the first air-fuel ratio sensor 19 may be corrected according to the value detected by the second air-fuel ratio sensor 21.

CAPABILITY OF EXPLOITATION IN INDUSTRY

As explained above, a method of and an apparatus for controlling the air-fuel ratio of an internal combustion engine according to the invention controls the air-fuel ratio of an intake air-fuel mixture to the engine to meet a target air-fuel ratio, self-corrects control accuracy to the target air-fuel ratio, and realizes a high order of accuracy and convergence of the self-correction. Accordingly, the invention is most suitable for controlling the air-fuel ratio of an electronic controlled fuel injection gasoline internal combustion engine, and is considerably effective at improving the quality and performance of the internal combustion egine.

I claim:

1. A method of controlling the air-fuel ratio of an internal combustion engine employing first and second air-fuel ratio sensors disposed on the upstream and downstream sides, respectively, of an exhaust purifying catalytic converter arranged in an exhaust path of the internal combustion engine, output values of the sensors changing in response to the concentration of a specific gaseous component contained in an exhaust from the engine, the concentration changing according to the air-fuel ratio, comprising:

a step of correcting and rewriting a learned regional correction quantity stored in one of a corresponding plurality of divided operation regions, according to the learned regional correction quantity and the output of the second air-fuel ratio sensor;

a step of adding a correction quantity corresponding to an average of the learned regional correction quantities to a stored learned collective correction quantity uniformly used for all operation regions, thereby updating the learned collective correction quantity;

a step of subtracting the correction quantity added to the learned collective correction quantity from each of the learned regional correction quantities for the operation regions, thereby correcting the learned regional correction quantities;

a step of calculating a first air-fuel ratio correction quantity according to the output of the first air-fuel ratio sensor;

a step of calculating a second air-fuel ratio correction quantity related to the output of the second air-fuel ratio sensor, according to the learned regional correction quantity of the corresponding operation region and the learned collective correction quantity;

a step of setting a final air-fuel ratio correction quantity according to the first and second air-fuel ratio correction quantities; and a step of controlling the air-fuel ratio of an intake air-fuel mixture to the engine according to the final air-fuel ratio correction quantity.

2. A method of controlling the air-fuel ratio of an internal combustion engine according to claim 1, comprising:

a step of determining the degree of progress of learning of each of the operation regions that are storing the learned regional correction quantities, respectively: and a step of prohibiting the correction quantity added to the learned collective correction quantity from being subtracted from the learned regional correction quantity of any one of the operation regions whose degree of progress of learning is determined to be below a predetermined degree.

3. A method of controlling the air-fuel ratio of an internal combustion engine according to claim 2, wherein the number of times that the output of the second air-fuel ratio sensor crosses a value corresponding to the target air-fuel ratio is found for each fo the operation regions that are storing the learned regional correction quantities, respectively, and the degree of progress of learning of each of the operation regions is determined according to the said number of times related to the operation region in question.

4. A method of controlling the air-fuel ratio of an internal combustion engine according to claim 1, wherein the first and second air-fuel ratio sensors change their output values in response to the concentration of oxygen contained in the exhaust.

5. A method controlling the air-fuel ratio of an internal combustion engine according to claim 1, wherein the second air-fuel ratio correction quantity is used for correcting a control quantity for the first air-fuel ratio correction quantity.

6. A method controlling the air-fuel ratio of an internal combustion engine according to claim 1, wherein the exhaust purifying catalytic converter is a three-way catalytic converter, and the first and second air-fuel ratio correction quantities are calculated in a way to bring air-fuel ratios detected by the first and second air-fuel ratio sensors close to a theoretical air-fuel ratio.

7. A method of controlling the air-fuel ratio of an internal combustion engine according to claim 1, wherein an average of the learned regional correction quantities is obtained when the output of the second air-fuel ratio sensor crosses a value corresponding to the target air-fuel ratio, and the learned collective correction quantity is corrected according to the average.

8. An apparatus for controlling the air-fuel ratio of an internal combustion engine including:

first and second air-fuel ratio sensors disposed on the upstream and downstream sides, respectively, of an exhaust purifying catalytic converter arranged in an exhaust path of the internal combustion engine, output values of the sensors change in response to the concentration of a specific gaseous component contained in an exhaust rom the engine, and the concentration changes according to the air-fuel ratio;

a first air-fuel ratio correction quantity calculation means for calculating a first air-fuel ratio correction quantity according to the output of the first air-fuel ratio sensor;

a second air fuel ratio correction quantity calculation means for calculating a second air-fuel ratio correction quantity according to the output of the second air-fuel ratio sensor;

an air-fuel ratio correction quantity calculation means for calculating a final air-fuel ratio correction quantity according to the frist and second air-fuel correction quantities; and an air-fuel ratio control means for controlling the air-fuel ratio of an intake air-fuel mixture to the engine according tot he final air-fuel ratio correction quantity calculated by the air-fuel ratio correction quantity calculation means, the second air-fuel ratio correction quantity calculation means comprising:

a learned collective correction quantity storage means for storing a learned collective correction quantity used for all operation regions;

a learned regional correction quantity storage means for storing learned regional correction quantities for a plurality of operation regions respectively;

a first means for correcting and rewriting the learned regional correction quantity of one of a corresponding operation regions stored in the learned regional correction quantity storage means, according to the learned regional correction quantity in question retrieved from the learned regional correction quantity storage means and the output of the second air-fuel ratio sensor;

a learned collective correction quantity correction means for adding a correction quantity derived from an average of the learned regional correction quantities to the learned collective correction quantity storage in the learned collective correction quantity storage means, thereby correcting and rewriting the learned collective correction quantity;

a second means for correcting the learned regional correction quantities of all the operation regions stored in the learned regional correction quantity storage means by subtracting the correction quantity added to the learned collective correction quantity by the learned collective correction quantity correction means from each of the learned regional correction quantities of the operation regions; and a means for calculating the second air-fuel ratio correction quantity according to the learned regional correction quantity of the corresponding operation region retrieved from the learned regional correction quantity storage means and the learned collective correction quantity stored in the learned collective correction quantity storage means.

9. An apparatus for controlling the air-fuel ratio of an internal combustion engine according to claim 8, comprising:

a learning progress determination means for determing the degree of progress of learning each of the operation regions stored in the learned regional correction quantity storage means; and a correction prohibition means for prohibiting the second means for correcting learned regional correction quantities from correcting the learned regional correction quantity of any one of the operation regions whose degree of progress of learning is determined to be below a predetermined degree.

10. An appartus for controlling the air-fuel ratio of an internal combustion engine according to claim 9, wherein the learning progress determination means determines the number of times the output of the second air-fuel ratio sensor crosses a value corresponding to the target air-fuel ratio for each of the operation regions stored in the learned regional correction quantity storage means, and determines the degree of progress of learning of each of the operation regions according to the said number of times related to the operation region in question.

11. An apparatus for controlling the air-fuel ratio of an internal combustion engine according to claim 8, wherein the first and second air-fuel ratio sensors change their output valves in response to the concentration of oxygen contained in the exhaust.

12. An apparatus for controlling the air-fuel ratio of an internal combustion engine according to claim 8, wherein the second air-fuel ratio correction quantity calculated by the second air-fuel ratio correction quantity calculation means is used for correcting a control quantity applied to the first air-fuel ratio correction quantity provided by the first air-fuel ratio correction quantity calculation means.

13. An apparatus for controlling the air-fuel ratio of an internal combustion engine according to claim 8, wherein the exhaust purifying catalytic converter is a three-way catalytic converter, and the first ad second air-fuel correction quantity calculation means calculates the first and second air-fuel ratio correction quantities in a way so as to bring air-fuel ratios detected by the first and second air-fuel ratio sensors close to a theoretical air-fuel ratio.

14. An apparatus for controlling the air-fuel ratio of an internl combustion engine according to claim 8, wherein the learned collective correction quantity correction means finds an average of the learned regional correction quantities when the output of the second air-fuel ratio sensor crosses a value corresponding to the target air-fuel ratio, and corrects the learned collective correction quantity according to the average.

* * * * *